(12) United States Patent
Lampi et al.

(10) Patent No.: US 7,335,280 B2
(45) Date of Patent: Feb. 26, 2008

(54) METHOD AND EQUIPMENT IN THE MEASUREMENT OF THE FLATNESS OF THE FLOW SURFACE OF THE HEADBOX OF A PAPER MACHINE

(75) Inventors: Petri Lampi, Jyväskylä (FI); Jukka Sallinen, Hankasalmi (FI)

(73) Assignee: Metso Paper, Inc., Helsinki (FI)

( * ) Notice: Subject to any disclaimer, the term of this patent is extended or adjusted under 35 U.S.C. 154(b) by 452 days.

(21) Appl. No.: 10/924,462

(22) Filed: Aug. 23, 2004

(65) Prior Publication Data

US 2005/0051291 A1    Mar. 10, 2005

(30) Foreign Application Priority Data

Aug. 26, 2003   (FI)   .................................. 20035137

(51) Int. Cl.
*D21F 1/02* (2006.01)
*D21F 7/06* (2006.01)
*G01B 11/30* (2006.01)

(52) U.S. Cl. ...................... 162/198; 162/263; 162/336; 162/344; 33/533; 33/552; 33/DIG. 21; 356/600; 73/105

(58) Field of Classification Search ................ 162/198, 162/199, 263, 272, 336, 344, 346; 33/533, 33/551–554, DIG. 21; 73/105; 356/600
See application file for complete search history.

(56) References Cited

U.S. PATENT DOCUMENTS

| 4,048,849 | A | * | 9/1977 | Gocho et al. | .................. 73/105 |
| 5,519,944 | A | * | 5/1996 | Delastre | ...................... 33/533 |
| 5,567,273 | A | * | 10/1996 | Offerhaus et al. | ........... 162/199 |
| 6,497,047 | B1 | * | 12/2002 | Miyagawa et al. | ........... 33/533 |

FOREIGN PATENT DOCUMENTS

DE        25 32 117        2/1976

\* cited by examiner

Primary Examiner—Eric Hug
(74) Attorney, Agent, or Firm—Fildes & Outland, P.C.

(57) ABSTRACT

A method in the measurement of the flatness of the flow surface of a headbox of a paper machine is disclosed. The flatness is determined by placing a measuring tool on the flat surface formed by the flow surface and measuring the position of the measuring tool at each point. A measuring sensor is arranged in the measuring tool, in order to determine the distance between the measuring tool and the flat surface. In addition, the dimensions provided by the measuring sensors are read and the position of the measuring tool and the dimensions from the measuring sensors are combined, in order to determine the values of the measured points. The invention also relates to equipment in the measurement of the flatness of the flow surface of the headbox of a paper machine.

14 Claims, 4 Drawing Sheets

METHOD AND EQUIPMENT IN THE MEASUREMENT OF THE FLATNESS OF THE FLOW SURFACE OF THE HEADBOX OF A PAPER MACHINE

FIELD OF THE INVENTION

The present invention relates to a method in the measurement of the flatness of the flow surface of the headbox of a paper machine, in which, according to the method, the flatness of the flow surface is determined by placing a measuring tool on the flat surface formed by the flow surface at several different points in the transverse direction and measuring the position of the tool at each point. The invention also relates to equipment in the measurement of the flatness of the flow surface of the headbox of a paper machine.

BACKGROUND OF THE INVENTION

In paper machines, as in board machines, the headbox plays a significant part in the successful formation of the web. In the headbox, a turbulence generator is also used to create a powerful turbulence in the fibre suspension. After the turbulence generator, there is a slice chamber in the headbox, which is bounded by an upper and a lower lip. The size and particularly the shape of the gap of the slice chamber determine how evenly the fibre suspension is sprayed onto the wire. In addition, the lower lip forms a flow surface, which is made as flat as possible and is often also polished. In other words, the aim is to achieve precise flatness and a small amount of surface roughness, in order to create an undisturbed spray. In practice, however, the upper and lower lips wear. In addition, uneven thermal expansion and deformations caused by accidents lead to changes in the flatness of the lower lip, which disturbs the web formation.

Making various measurements in order to determine the condition of the headbox and particularly the lower lip is a known procedure. The need for repair measures can then be decided on the basis of the results. At present, known measurements are based on a tachymeter or similar levelling device, which is set at the side of the headbox when its side walls are removed. In the measurement, a measuring rod, at which the tachymeter is aimed, is set on the flat surface of the lower lip. The measuring rod is moved in the machine direction and cross direction of the paper machine. The results of the measurement are entered in a record, in which there are data on the measurement object and its dimensions. Correspondingly, an angle gauge connected to a straightedge is used to determine the angle of flow of the headbox.

When measuring in the known manner, the side walls of the headbox must be first be removed. In addition, errors are easily made when placing the measuring rod and when using the tachymeter. Recording also takes a great deal of time as there are tens and even hundreds of points being measured. The accuracy of the measuring rod in the measurement of flatness is at most satisfactory while together with operating errors the final result of the flatness of the lower lip may be erroneous. In practice, the measurement is also slow and at least two trained operators are required to make it.

SUMMARY OF THE INVENTION

The invention is intended to create a new type of method in the measurement of the flatness of the flow surface of the headbox of a paper machine, which is simpler than before. In addition, the invention is intended to create a new type of equipment in the measurement of the flatness of the flow surface of the headbox of a paper machine, which is more accurate than previously, but which is also faster and easier to use than known equipment. Accordingly a method according to the present invention in the measurement of the flatness of the flow surface of the headbox of a paper machine, in which, according to the method, the flatness of the flow surface is determined by placing a measuring tool on the flat surface formed by the flow surface at several different points in the transverse direction and measuring the position of the measuring tool at each point, is characterized in that a measuring sensor is arranged at at least two point in the longitudinal direction of the measuring tool, in order to determine the distance between the measuring tool and the flat surface at the points in question, the relative dimensions provided by the measuring sensors are read, and the position of the measuring tool and the dimensions from the measuring sensors are combined, in order to determine the absolute values of the measured points.

Correspondingly, equipment according to the invention in the measurement of the flatness of the flow surface of a headbox in a paper machine, which equipment includes a measuring tool, which is arranged to be set at several different points on the flat surface formed the flow surface, a measuring device for measuring the position of the measuring tool at each point, and means for recording the measurement results, is characterized in that at at least two different points in the longitudinal direction there is a measuring sensor in the measuring tool for measuring the distance between the measuring tool and the flat surface at the points in question, and means are arranged for combining the relative dimensions provided by the measuring sensors and the position of the measuring, in order to determine the absolute values of the measured points.

When using the method and equipment according to the invention, several points are measured at one time, which considerably accelerates the measurement. In addition, a special measuring tool, which is easy to place on a flat surface, is used. Besides the measurements of different points, the equipment is used to simultaneously measure other quantities as well, so that the condition of the flow surface can be charted with a single measurement. Despite the rapid measurement, the accuracy of the results is excellent and the results can be processed and presented comprehensively. In addition, the measuring tool and the entire equipment can be easily calibrated prior to measurement, after which the flow surface can be measured without interruption. The method and equipment according to the invention can be used particularly in the measurement of the flatness of the lower lip of the headbox slice chamber.

These and other features and advantages of the invention will be more fully understood from the following detailed description of the invention taken together with the accompanying drawings.

DETAILED DESCRIPTION OF THE INVENTION

Figure 1:
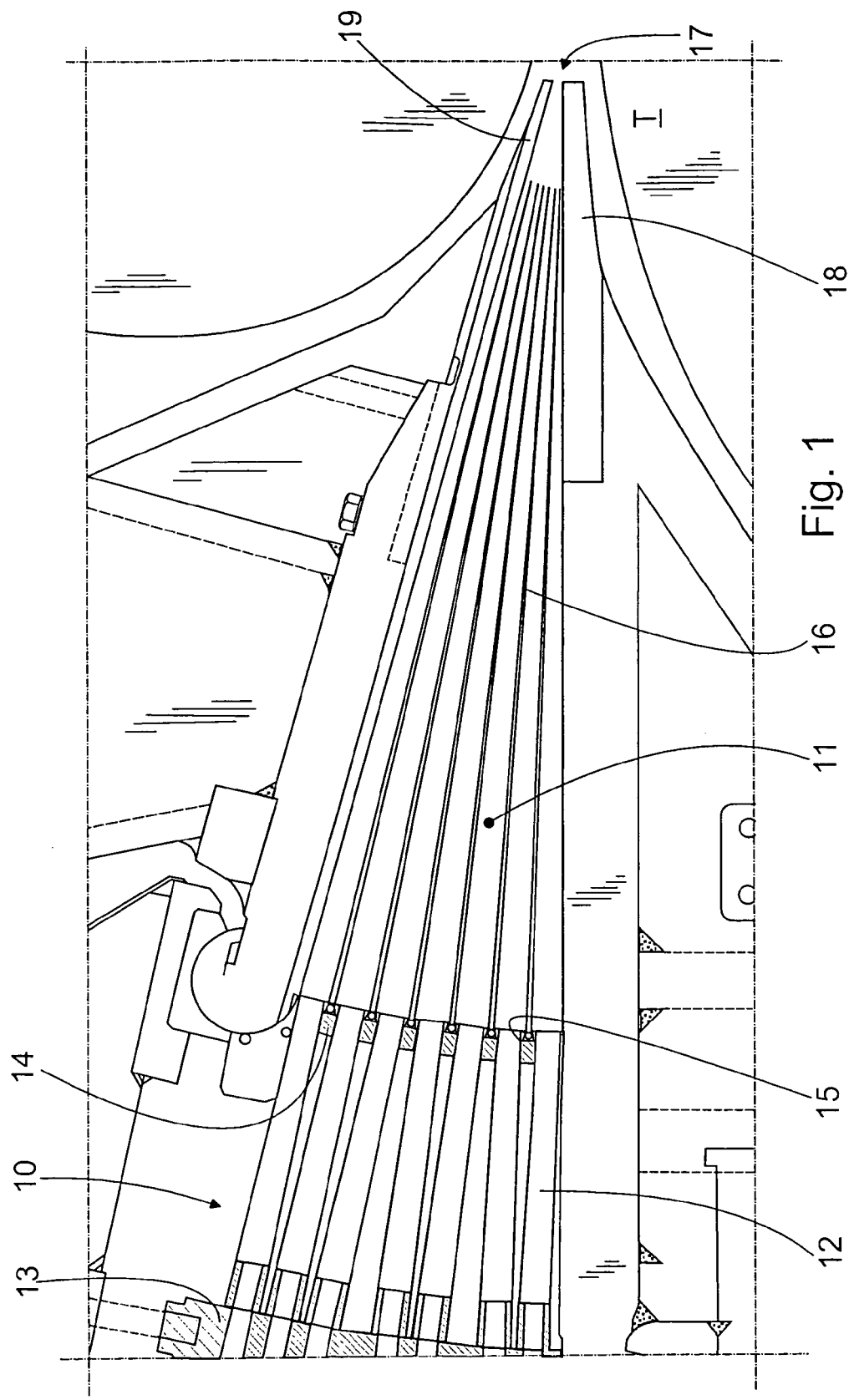
FIG. 1 shows a cross-section of part of the headbox of a paper machine.

FIG. 1 shows part of the headbox of a paper or board machine, which is, as such, conventional. As is known, the fibre suspension used in the manufacturing process is fed through a turbulence generator 10 to the slice chamber 11. The turbulence generator is used to separate the fibres from each other and to align them irregularly relative to each other. In this case, the turbulence generator 10 is formed of several tubes 12, which are supported at both ends on sturdy plates 13 and 14. Openings 15 are machined in the plate bounding the slice chamber 11, into which the said tubes 12 are inserted. In FIG. 1, the tubes 12 are in seven rows one above the other, which extend over the entire width of the headbox. The tubes 12 are set at a specific angle to each other, in such a way that the flows discharging from the different rows of tubes are combined in the discharge opening 17. FIG. 1 does not, however, show the stock or its flows. After the turbulence generator 10 in the slice chamber 11, there are turbulence vanes 16, which are used to maintain the desired level of turbulence as far as the discharge opening 17 and the wire section. In this case, the stock discharges from the discharge opening 17 onto the wire supported by the roll T and is carried onward by it.

The slice chamber 11 terminates at the protruding lower lip 18, which forms a flat surface 20. The lower lip is a permanent part of the headbox and remains stationary when the headbox is in operation. The upper lip 19, on the other hand, is articulated to the headbox, so that it can be rotated during maintenance. In addition, there are generally adjustment rods at certain intervals in the upper lip, by means of which the profile of the discharge opening can be adjusted (not shown). When servicing the headbox, and particularly when determining the condition of the lower lip, the structures following the headbox are dismantled and the upper lip is turned to the maintenance position. Access is then gained to the lower lip over its full width.

Figure 2:
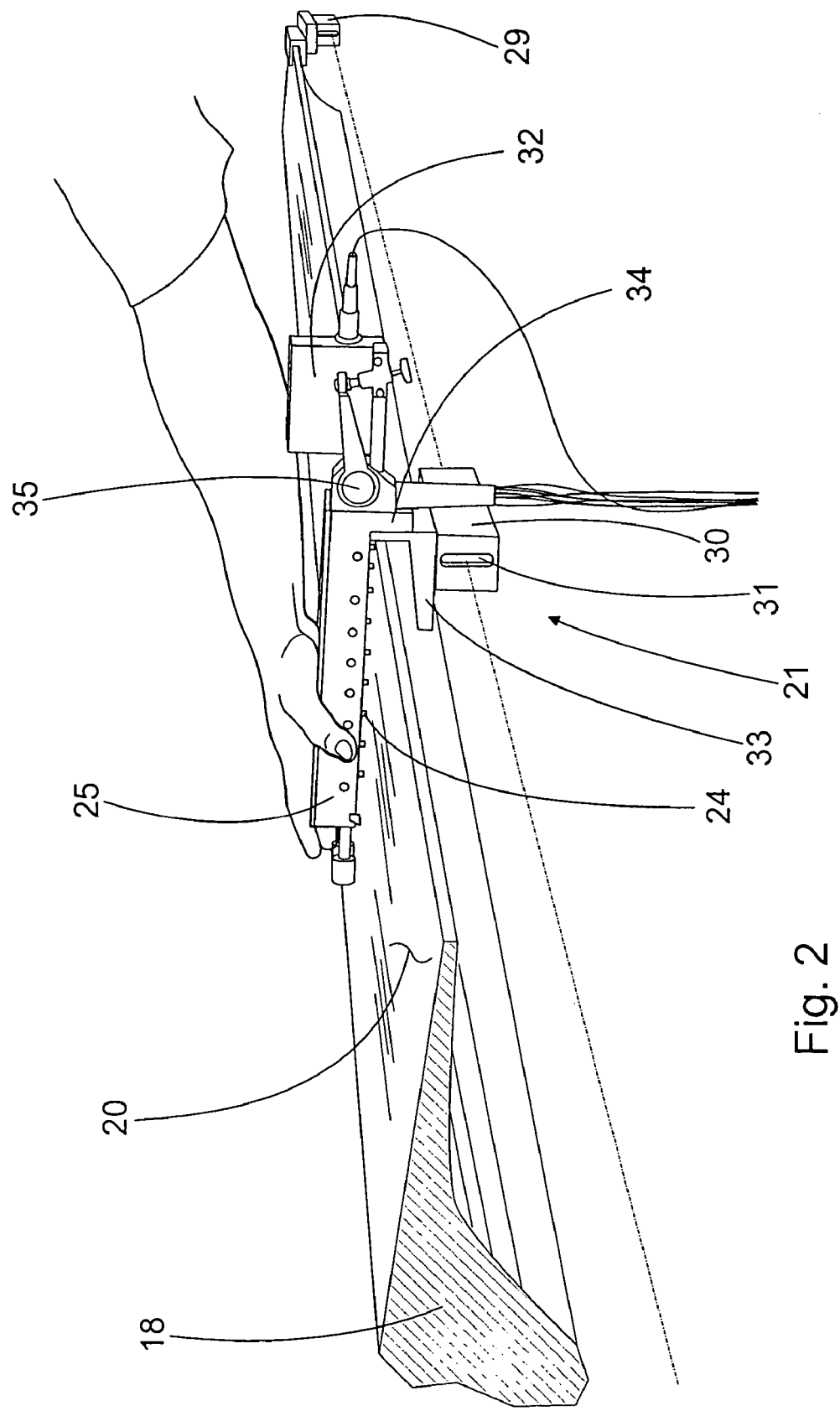
FIG. 2 shows the measuring tool according to the invention, set on the flat surface formed by the lower lip.

When measuring the flatness of the lower lip 18 of the headbox of a paper machine, a measuring tool 21 is used, which is placed on the flat surface 20 formed by the lower lip 18 at several different points in the transverse direction. In addition, a measuring device 22 is required, for measuring the position of the measuring tool 21 at each point. In addition, suitable means 23 are used to record the measurement results. FIG. 2 shows the measuring tool 21 according to the invention placed on top of the lower lip 18. Surprisingly, at at least two different points is the longitudinal direction, there is a measuring sensor in the measuring tool 21, for measuring the distance between the measuring tool 21 and the flat surface 20 at the point in question. In other words, the lower lip is measured at one time in the longitudinal direction of the headbox, i.e. in the direction of flow of the fibre suspension. In addition, the means included in the equipment are arranged to combine the relative dimensions provided by the measuring sensors and the position of the measuring tool, in order to determine the absolute values of the measured points. The measuring procedure is dealt with later in greater detail.

Figure 3A:
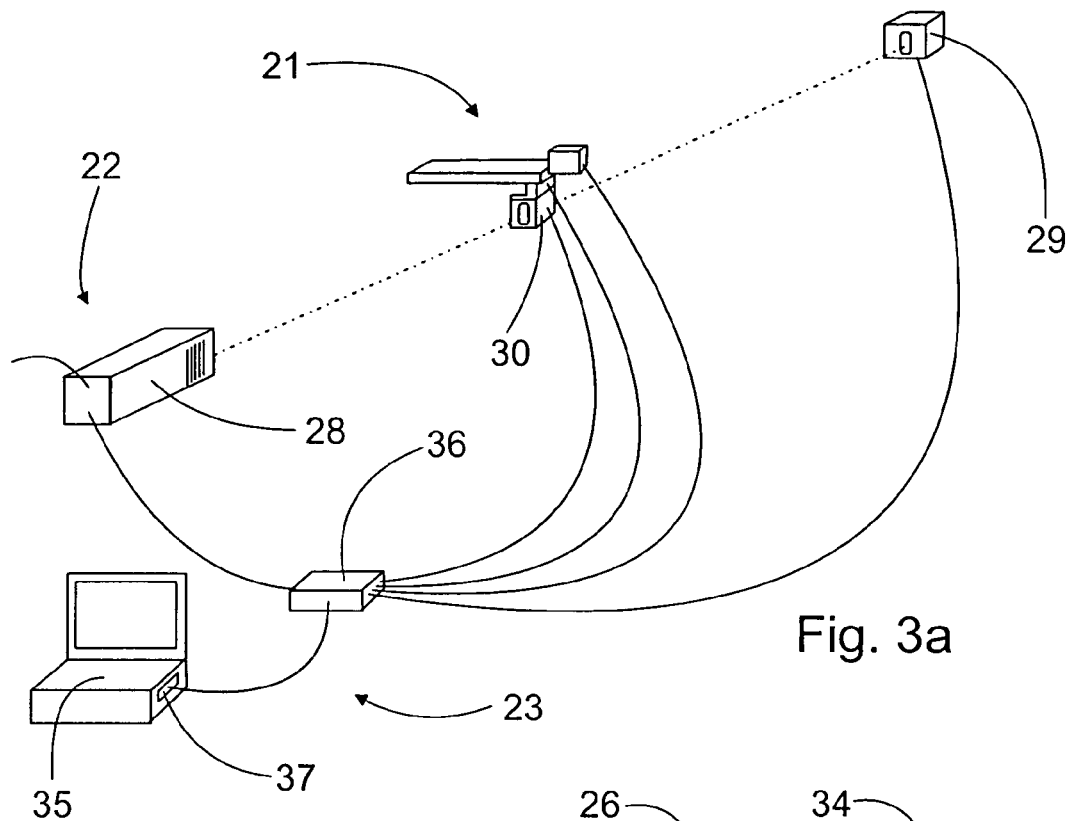
FIG. 3a shows a schematic diagram of the equipment according to the invention.
Figure 3B:
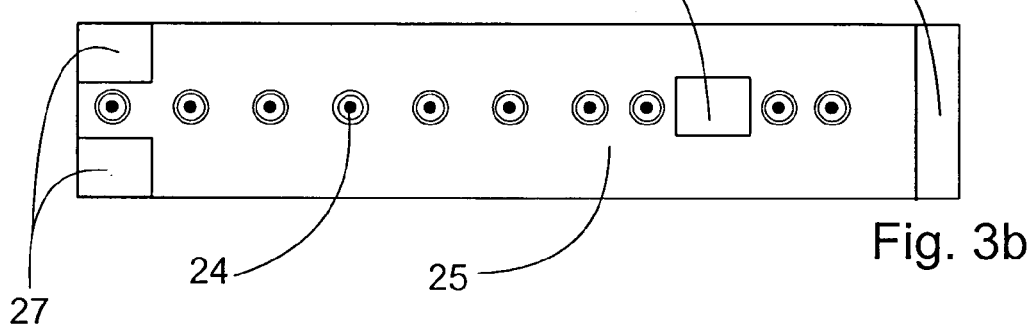
FIG. 3b shows a bottom view of the body of the measuring tool according to the invention.
Figure 3C:
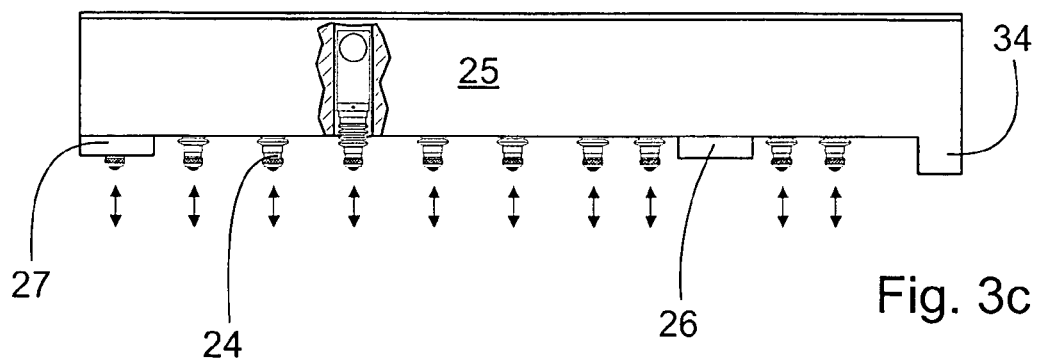
FIG. 3c shows a side view of the body of FIG. 3b.

The measuring tool 21 according to the invention includes a rigid beam 25, to which three feet 26 and 27 are fitted. The body formed by the beam 25 is shown in FIGS. 3b and 3c. One foot 26 is arranged at one end of the beam 25 and is intended to be placed at the front edge of the lower lip 18 (FIG. 2). The two other feet 27 are at the other end of the beam 25. Thanks to the three feet, the measuring tool always settles parallel to the flat surface, so that it is easy to set up the measuring tool. According to the invention, there are 4-14, preferably 6-10 measuring sensors. It is therefore possible to achieve a more accurate measurement of the flatness, as the measurement intervals are clearly shorter than those known. Nearly any sensor can be used as a measuring sensor, by according to the invention each measuring sensor is a separate differential transformer, for which the abbreviation LVDT (Linear Variable Differential Transformer) is also used. The sensor in question is very small and has excellent discrimination. In addition, the construction of the sensor is simple and maintenance-free. In the body shown in FIGS. 3b and 3c, there are ten differential transformers, of which the first four are arranged more closely together than the last six. This achieves the greatest measurement accuracy at the front edge of the lip, the condition of which it is more important to measure than that of the rest of the lower lip. In addition, a spring load is arranged in the differential transformers, in order to create a reliable contact.

The above description is on the measuring tool according to the invention, which is only one part of the equipment. Though the measuring tool can be used to make flatness measurements, the results of these measurements will be relative and separate from the headbox. In order to combine the measurement results with each other, the equipment according to the invention includes a measuring device 22. The measuring device 22 is a laser 28, preferably a semiconductor laser equipped with distance measurement. The laser is of an advantageously small size and can be used to achieve excellent precision. In addition to distance, the position of the tool can also be determined with the aid of the laser. According to the invention, the measuring device remains in one place, so that if necessary the measurements can be performed by one person. For the laser, the equipment includes a photosensitive reference sensor, which is arranged to be placed at the opposite end of the headbox to the laser, in order to determine the base level. FIG. 3b shows the reference sensor 29. According to the invention, the laser and the reference sensor are attached to the headbox at the start of the measurement, after which only the measuring tool is moved.

In the measuring tool 21 too there is a photosensitive sensor 30 for the laser 28, the sensor window of which is arranged at the base level, in order to determine the deviation of the measuring tool 21 relative to the base level. In other words, at each measurement point, the position of the measuring tool is determined without moving the laser. In practice, both photosensitive sensors are preferably CCD cells, which provide a reading of the point struck by the laser beam. The laser beam is shown in FIGS. 2 and 3a by a broken line. The discrimination of the CCD cells used in the equipment is ±0,002 mm and the measurement range is ±10 mm. Further, the laser and the reference sensor are arranged to be installed on the front side of the front edge of the lower lip. In FIG. 2, the reference sensor 29 is also attached beneath the lower lip 18. When the base level is outside of the headbox, measurements can be made with the side walls of the headbox in place. This shortens the time needed for the preparations for the measurement.

The use of the equipment described above allows of the position of the tool relative to the base line and the deviation of the measurement points relative to the tool to be measured at one time. As there can be even large irregularities in very worn lower lips, the equipment according to the invention includes an angle sensor 32 arranged in connection with the measuring tool (FIG. 2). The angle sensor is used to determine the longitudinal alignment of the measuring tool, which is taken into account when determining flatness. The angle of flow of the headbox can also be easily determined from the alignment.

The equipment according to the invention simplifies and accelerates measurements for determining flatness. Prior to measurement, the headbox is opened and cleaned normally. After this, the laser and reference sensor are set in place in the headbox. The alignment and attachment of the laser are ensured using a special support arm, in which there are also precise adjustment elements (not shown). Thus, the laser is set precisely towards the reference sensor. After this, the measurement is started, for example, from the edge at the side with the laser, by placing the measuring tool 21 on top of the lower lip (FIG. 2). The photosensitive sensor 30 of the measuring tool 21 is attached to a protrusion 34 in the beam 25, using a spacer piece 33. The spacer piece and its attachment to the protrusion are arranged in such a way that the position and alignment of the photosensitive sensor relative to the beam remained unaltered for the entire duration of the measurement. In addition, the spacer piece is set against the front edge of the lower lip, so that it is easy to always install the measuring tool in the same way at each point. In addition, the spacer piece is preferably of plastic, so that the front edge of the lower lip will remain undamaged.

In the measuring tool, there is thus a measuring sensor at at least two points in the longitudinal direction of the headbox, by means of which the distance between the measuring tool and the flat surface is measured. By using several measuring sensors, the values at several points are measured simultaneously. In practice, in the measurement, the relative values given by the measurement sensors relative to the measuring tool are read. Finally, the position and dimensions of the measuring tool are combined, in order to determine the absolute values of the points measured from the measuring sensors. In other words, with the aid of a photosensitive sensor, the position of the measuring tool is obtained, from which the values of the measured points can be determined. Preferably, when measuring each point in a transverse direction, the alignment of the measuring tool in the longitudinal direction relative to the headbox is also measured, using the angle sensor referred to above. In the measuring tool 21 according to FIG. 2, a clinometer with an accuracy of ±2 mm/m, is used as the angle sensor 32. For this reason, the angle sensor 32 is attached to the beam 35 through an adjusting element 35. Thus, at the start of the measurement, the angle sensor can be set in such a way that the measuring area is sufficient for the entire measurement. Nowadays, angle sensors are also available with a measuring area of ±60°. In addition, these sensors are small, so that they can be permanently fitted inside the measuring tool. At the same time, the adjusting elements referred to above will be unnecessary, which will reduce the size of the measuring tool and the number of inaccuracy factors.

In practice, the length of the measuring tool's beam is about 300 mm. Thus, using several measuring sensors, the entire lower lip can be measured in the longitudinal direction of the headbox. Thus, according to the invention, the measuring tool is set in place at only one point in the longitudinal direction of the headbox and the measuring tool is moved only in the transverse direction of the headbox. However, when moving the measuring tool, it is lifted clear of the lower lip, to avoid damaging the flat surface. The devices described above are all electro-optical devices. In other words, they provide electronic data corresponding to the alignment of each sensor. According to the invention, the devices are also connected to a computer 35, which is used to process and record the measurement results. FIG. 3a also shows a signal amplifier 36, by means of which the millivolt voltages output by the sensors 24, 29, and 30 are amplified. The signal amplifier 36 is either connected directly to a port of the computer 35, or else a separate measurement card 37 is used. Thus, the computer is used to collect readings from the different sensors, for example, over cables, according to FIG. 3a.

Figure 4A:
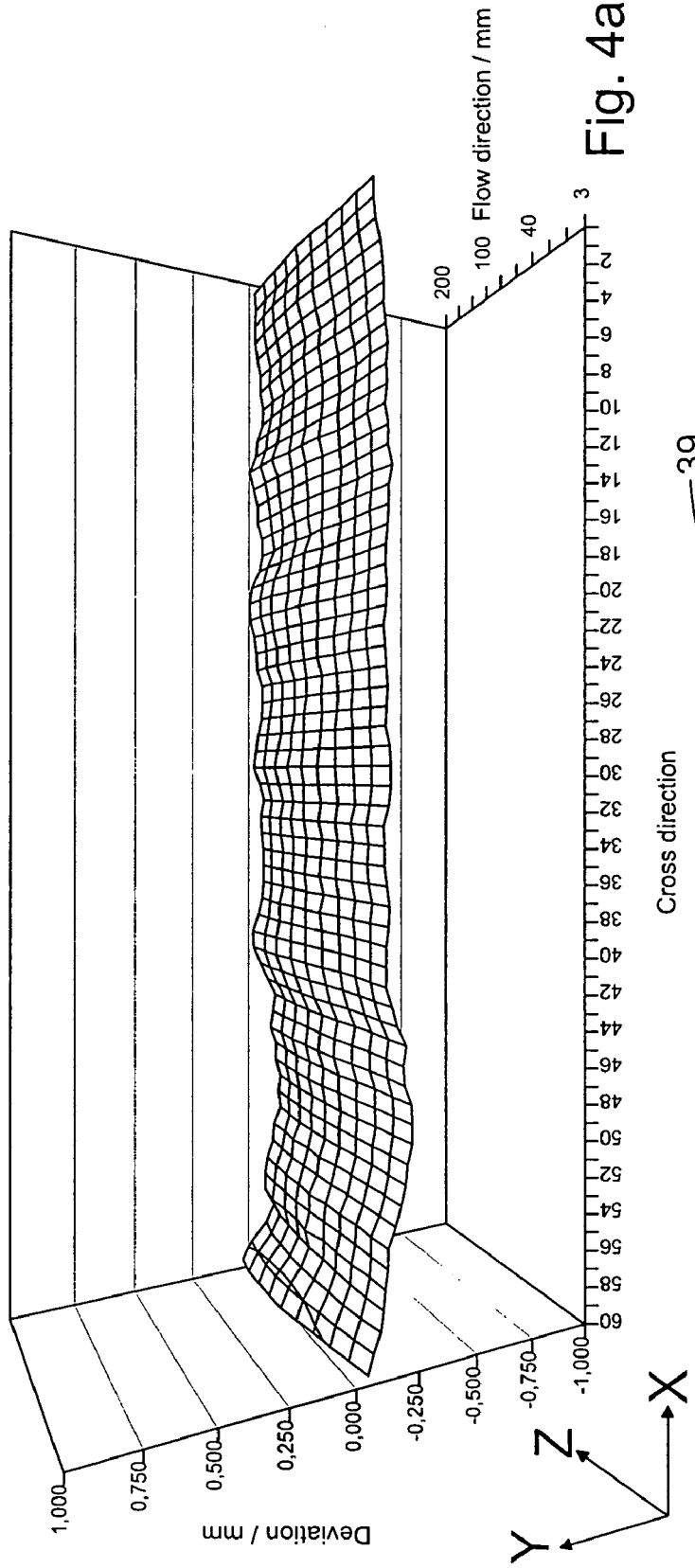
FIG. 4a shows a three-dimensional model depicting the flatness of the lower lip formed using the equipment according to the invention.

In practice, the measurement is performed by two people, one of whom is at the computer while the other moves and sets up the measuring tool. Once the measuring tool is correctly set up on the flat surface, the computer is given a measurement command, when the readings of all the sensors are read and recorded according to the software. Immediately after the recording, the measuring tool can be set up at the following point. Remote control can also be arranged in the computer, so that even one person can perform the measuring. Before measuring, the measuring tool can be calibrated using a test piece that is known to be flat. When the measuring tool is on top of the test piece, the reading of the measuring sensors are read and, if necessary, the readings are set to zero by the software. The said measuring and calibration software is located in the computer. Thanks to the equipment according to the invention, the position of the measuring tool at different points in the transverse direction can also be determined relatively over the entire width of the headbox. In other words, during measurement all the values are relative, firstly the position of the photosensitive sensor relative to the laser beam and secondly the values of the measuring sensors relative to the measuring tool. Only once measurement has ended is the measurement fixed to the headbox, in order to determine the absolute values of the measured points. Fixing takes place on the basis of the reference sensor, the position of which relative to the lower lip is known. In fixing, the distance measurement of the laser and calculation are used, in which case the complete profile of the flat surface with the real dimensions is obtained as the final result. In addition, the software can be used to form a three-dimensional model, shown in FIG. 4a, depicting the profile of the flat surface. On the Y-axis are the deviations in millimetres of the measurement points. As can be seen from FIG. 4a, the deviations are only some hundredths of a millimetre. On the X-axis are the locations of the transverse measurement points. In the measurement in question, 60 measurements were made, which, in practice, means measurements at 130-mm intervals transversely over an 8000-mm headbox. On the Z-axis are the locations of the measured points in the longitudinal direction of the lower lip. In this case, the lower lip is measured over a distance of 200 mm, which is entirely sufficient in practice. Thus, each node in the model shown represents a measuring sensor reading, which is fixed to the headbox.

Figure 4B:
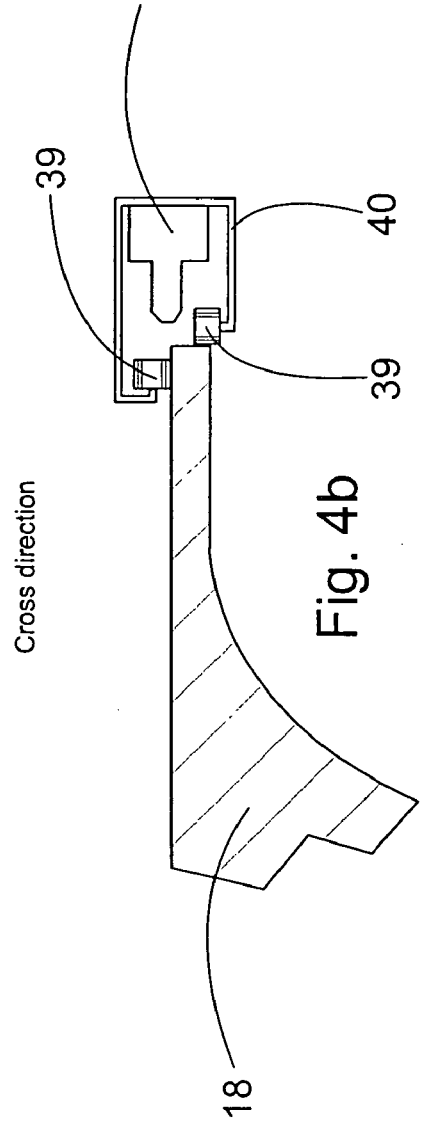
FIG. 4b shows a side view of the digital camera belonging to the equipment.

If necessary, after determining the flatness, the lower lip can, for example, be ground. Thanks to the speed of the measurement, the flatness of the lower lip can be re-measured after maintenance procedures. Grinding starts from the front edge, i.e. the frontal surface of the lower lop, after which the flat flow surface is ground. In practice, fine grinding waste accumulates at the corner, which can, for instance, cause streaking in the web and interfere with the control of the cross-direction profile of the web. The problem is aggravated by the accumulation being undetectable visually or to the touch. In order to detect an accumulation, the equipment includes a digital camera 38, which is arranged to the set in front of the lower lip 18, in order to image it from in front. This is shown in FIG. 4b. The digital camera 38 also includes a base 40 equipped with rolling elements 39 for moving the camera during imaging on the flat surface of the lower lip 18 and thus for determining the profile of the front edge of the lower lip. The digital camera can be easily connected the aforementioned computer. In addition, by arranging, for example, a pulse sensor in the rollers acting as the rolling elements, the imaging point can be defined precisely. With the aid of the base, the digital camera is held at the correct point. This is essential, as very great enlargement is used in the imaging and the digital camera has a small imaging area. The front edge can be quickly images over the entire width of the headbox and the recorded image can be viewed from the computer, in order to determine the problem points. On the basis of the position information, the accumulation can then be ground off. Again thanks to the rapid imaging, the front edge can be re-imaged immediately, thus ensuring the condition of the headbox.

Using the method and equipment according to the invention, the condition of the lower lip of the headbox can be measured and determined rapidly and precisely. In addition to flatness, the end result includes longitudinal and transverse deviations in the flat surface. In practice, the measurement takes about fifteen minutes. The method and equipment according to the invention can be used when the headbox is attached to the structures of the paper machine, or when the headbox is detached from the paper machine. In addition, the equipment can be used to measure both horizontal and vertical headboxes. Here, the term paper machine refers to paper, board, and tissue machines, as well as to a cellulose drying machine.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A method in the measurement of the flatness of a flow surface of a headbox of a paper machine, in which, according to the method, the flatness of the flow surface is determined by placing a measuring tool on the flat surface formed by the flow surface at several different points in the transverse direction and measuring the position of the measuring tool at each point, the method comprising the steps of:

arranging a measuring sensor at at least two points in the longitudinal direction of the measuring tool, in order to determine the distance between the measuring tool and the flat surface at the points at which the measuring tool is placed, said measuring tool being set for a period of time at one of said points in the transverse direction of the headbox and after said period of time the measuring tool being moved in the transverse direction of the headbox to another of said points in the transverse direction of the headbox;

reading relative dimensions provided by the measuring sensors at each said point in the transverse direction of the headbox, and combining the position of the measuring tool and the dimensions from the measuring sensors, in order to determine the absolute values of the measured points;

arranging an angle sensor in connection with the measuring tool; and determining the longitudinal alignment of the measuring tool by means of said angle sensor.

2. A method according to claim 1, characterized in that the flatness is measured from the lower lip belonging to the headbox, which forms the said flow surface of the headbox.

3. A method according to claim 1, characterized in that, in the measurement of each transverse point, the longitudinal alignment of the measuring tool relative to the headbox is also measured.

4. A method according to claim 1, characterized in that, in the measurement, electro-optical devices are used, and are connected to a computer, in order to process and record the measurement results and to form a three-dimensional model depicting the profile of the flat surface.

5. A method according to claim 1, characterized in that the position of the measuring tool at different transverse points is determined relatively over the entire width of the headbox, after which the measurement is fixed to the headbox, in order to determine the absolute values of the measured points.

6. Equipment in the measurement of the flatness of a flow surface of a headbox in a paper machine, the equipment comprising:

a measuring tool, which is arranged to be set at several different points on the flat surface formed by the flow surface;

a measuring device for measuring the position of the measuring tool at each of said several different points;

means for recording the measurement results;

the measuring tool including a measuring sensor at at least two different points in the longitudinal direction of the measuring tool for measuring the distance between the measuring tool and the flat surface at the several different points at which the measuring tool is set;

means are arranged for combining relative dimensions provided by the measuring sensors and the position of the measuring tool, in order to determine the absolute values of the measured points; and an angle sensor arranged in connection with the measuring tool, for determining the longitudinal alignment of the measuring tool.

7. Equipment according to claim 6, characterized in that the measuring tool includes a rigid beam, to which three feet are fitted, of which one foot is arranged at one end of the beam, to be installed at the front edge of the lower lip forming the flow surface.

8. Equipment according to claim 6, characterized in that there are 4-14, measuring sensors, each of which is a separate differential transformer.

9. Equipment according to claim 6, characterized in that the measuring device is a laser, preferably a semiconductor laser equipped with distance measurement.

10. Equipment according to claim 9, characterized in that for the laser the equipment includes a photosensitive reference sensor, which is arranged to be fitted at the opposite end of the headbox to the laser, for determining a base level.

11. Equipment according to claim 10, characterized in that for the laser there is a photosensitive sensor in the measuring tool, the sensor window of which is arranged at the base level, in order to measure the deviation of the measuring tool relative to the base level.

12. Equipment according to claim 10, characterized in that the laser and the reference sensor are arranged to be set in front of the front edge of the lower lip forming the flow surface, in order to set the base level outside of the headbox.

13. Equipment according to claim 6, characterized in that the equipment includes a digital camera, which is arranged to be set in front of the lower lip forming the flow surface, for imaging it from in front.

14. Equipment according to claim 13, characterized in that the digital camera includes a base equipped with rolling elements for moving the digital camera over the flat surface of the lower lip during imaging and thus for determining the profile of the front edge of the lower lip.

* * * * *